Aug. 8, 1933.   L. E. SMOOT   1,921,329
REVERSIBLE TOOTH SPROCKET WHEEL AND METHOD OF MAKING SAME
Filed May 8, 1929   2 Sheets-Sheet 1
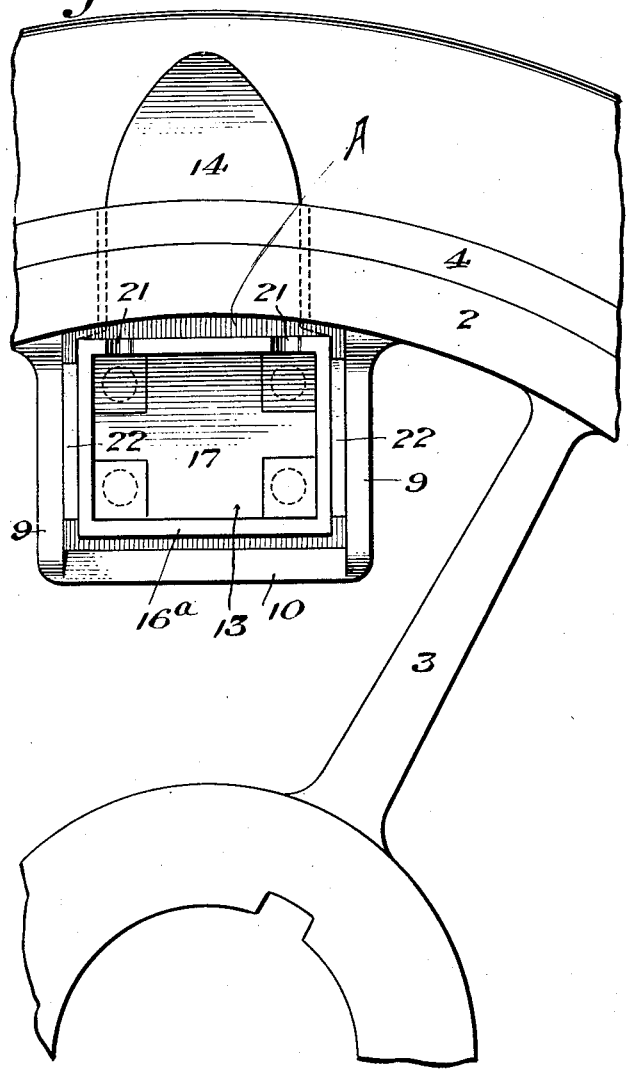
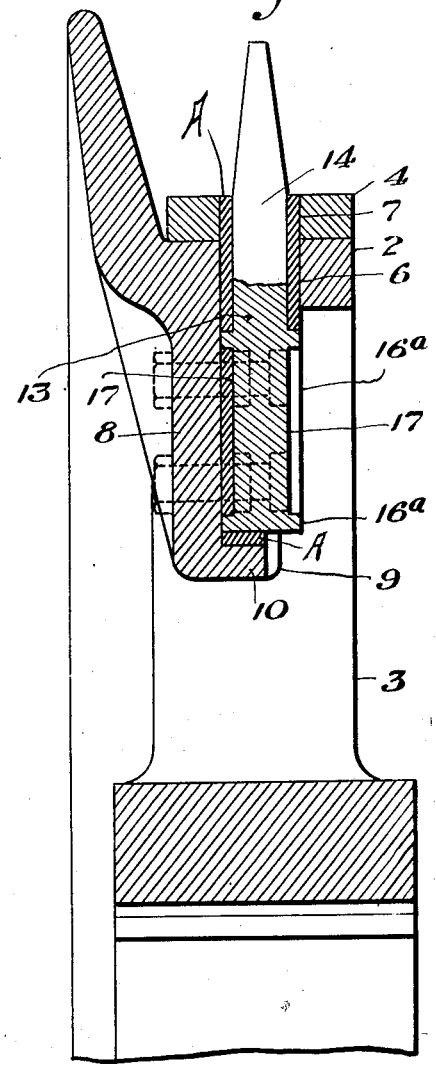
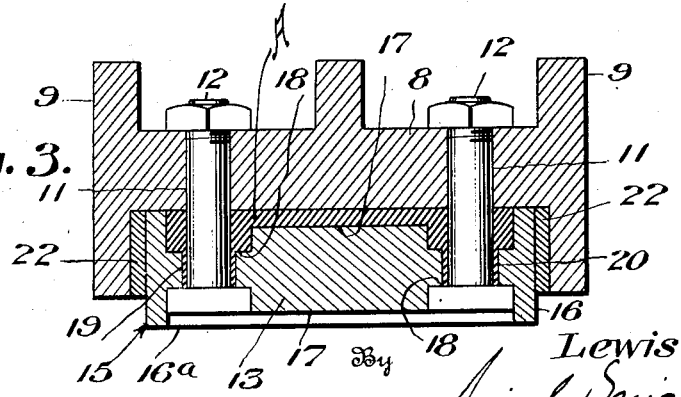
Inventor
Lewis E. Smoot
By Smith & Michael
Attorney Aug. 8, 1933.  L. E. SMOOT  1,921,329
REVERSIBLE TOOTH SPROCKET WHEEL AND METHOD OF MAKING SAME
Filed May 8, 1929  2 Sheets-Sheet 2

Inventor
Lewis E. Smoot
By
Attorney

Patented Aug. 8, 1933

1,921,329

UNITED STATES PATENT OFFICE 1,921,329

REVERSIBLE TOOTH SPROCKET WHEEL AND METHOD OF MAKING SAME

Lewis E. Smoot, Washington, D. C.

Application May 8, 1929. Serial No. 361,341

11 Claims. (Cl. 74—31)

This invention is a sprocket wheel having detachable, reversible teeth.

In various types of power transmissions employing sprocket and chain gearing, the conditions are such that the sprocket gears run in the same direction at all times. This mode of operation results in excessive wear on the leading edges of the teeth while the trailing edges receive little or no wear and consequently are as good as new even when the leading edges of the teeth have become so badly worn as to necessitate replacement of the gear or sprocket. These conditions exist particularly in apparatus such as chain-bucket dredges and conveyors, handling material such as coal, sand, gravel and similar hard, gritty materials, the fine particles of which cut into the teeth so quickly as to render the cost of sprocket replacements prohibitive.

In order to remedy this situation it has been proposed to provide sprocket wheels having detachable teeth so that when the teeth become so badly worn as to be incapable of further use, it is only necessary to replace the teeth, the sprocket spider or blank being again used to mount the new teeth and to thus form a new sprocket. Even in cases where sprocket wheels of this nature have been used, the cost of replacement is still excessive due to the amount of machining required on the individual teeth and on the sprocket wheel blank to so form these parts as to enable the teeth to be accurately and securely mounted on the blank and to insure that the thus formed sprocket will properly engage with its sprocket chain.

With these facts in mind the present invention seeks to provide a sprocket wheel having detachable teeth which are so designed that they may be reversed with respect to the direction of travel of the wheel. By this means alone the normal life of the wheel or teeth is doubled since, when the leading edges of the teeth have become excessively worn the teeth may be detached and reversed, to place the formerly trailing tooth edges, in position to receive the load on the chain.

Furthermore, the present invention provides a sprocket wheel of the type indicated having teeth of extremely hard and wear-resisting metal such as manganese steel. Heretofore it has been impracticable to use sprocket wheels composed entirely of this or similar alloy due to the excessive cost of such materials. It has also been impracticable to use detachable teeth made of manganese steel as no satisfactory method for attaching such teeth to a sprocket wheel blank has been devised, particularly due to the fact that this material is exceedingly difficult to machine.

Another object of the present invention is to provide a sprocket wheel of the type indicated wherein the individual teeth cast from manganese steel may be secured accurately to a sprocket wheel blank without the necessity of machining the teeth.

Another object of the invention is to provide means for attaching a tooth of the type indicated to a sprocket wheel blank in a manner such that the built up sprocket wheel will be substantially as strong and rigid as a wheel having integral teeth.

A further object of the invention is to provide a sprocket wheel blank with suitable supporting plates or pockets designed to receive the teeth, said pockets being dimensioned with respect to the teeth to allow relative shifting of the teeth within the pockets in order that the teeth may be accurately positioned with respect to the pitch of the gear before they are secured in position.

Another object of invention is to provide keys or similar wedging elements between the walls of the tooth pockets and the teeth to prevent relative shifting or skewing of the teeth after they have been accurately positioned. Means are also provided for positively holding said keys or wedges in position.

The invention also contemplates the use of a flowable metal packing for sealing the spaces between the teeth and sprocket parts, whereby to unite the tooth element and sprocket blank in a substantially integral structure.

These and other objects of the present invention will become apparent from the following specification, read in connection with the accompanying drawings wherein I have illustrated a preferred embodiment of my invention and wherein:

Fig. 1 is a fragmental elevation of a sprocket wheel made in accordance with my invention and showing one of the teeth secured to the rim of the wheel;

Fig. 2 is a vertical sectional view taken through a tooth and the sprocket rim;

Fig. 3 is a horizontal sectional view taken through a tooth shank and its supporting plate or pocket;

Figure 4:
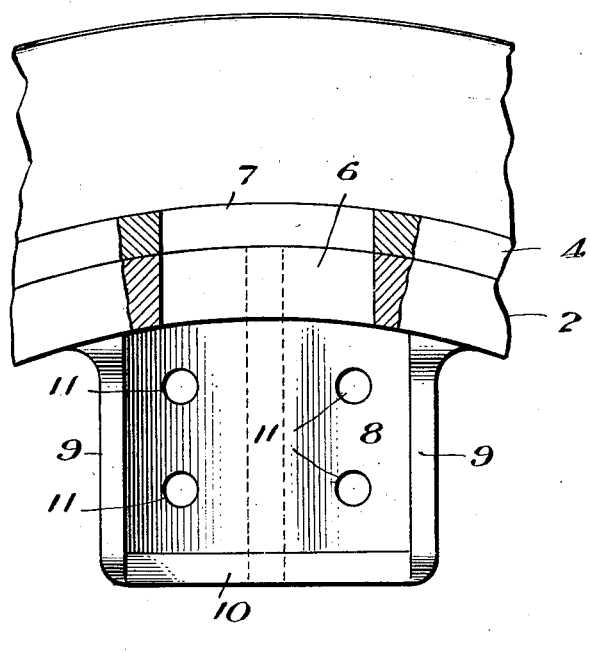
Fig. 4 is a fragmental view partly in section showing one of the tooth pockets.

Referring more particularly to the accompanying drawings wherein like reference numerals designate like parts throughout, the numeral 1 designates the hub of a sprocket wheel blank comprising also a rim section 2 and spoke elements 3. Of course, if desired, the wheel blank may be made as a disk instead of a spoked wheel, in which case, the spokes 3 would be replaced by a continuous web extending from the hub to the rim in a well known manner.

The sprocket wheel blank may be cast from any suitable material such as iron or steel and if desired the rim section 2 may be reinforced by an auxiliary band or tire 4, the latter being preferably made of some metal more resistant to wear than the metal of the sprocket wheel blank and shrunk on to the rim of the sprocket wheel blank in the well known manner. The sprocket blank is preferably provided with one or more chain guiding flanges 5, but this feature forms no part of the present invention.

Figure 5:
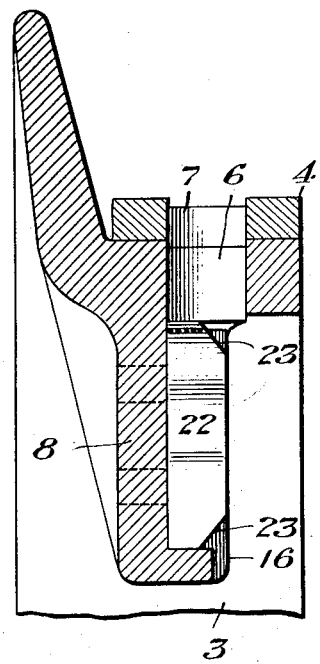
Fig. 5 is a vertical sectional view through a tooth pocket showing one of the lateral keys or wedges in position.

The rim section 2 or the sprocket wheel blank is provided at intervals corresponding to the positions to be occupied by the sprocket teeth, with tooth receiving openings 6 (see Figs. 4 and 5). These openings are shown as extending radially through the rim 2 and, where the rim is provided with a reinforced tire as shown in the accompanying drawings, the tire is correspondingly apertured as at 7. The wheel blank is also provided adjacent to each tooth opening 6 with a tooth supporting plate 8, which is preferably provided with upstanding flanges 9 and 10 on the side and bottom edges respectively, said flanges functioning to enclose the plate 8 on three sides thereof, and with the rim section 2, form a pocket designed to receive one of my improved tooth elements which will be more particularly described hereinafter.

Figure 6:
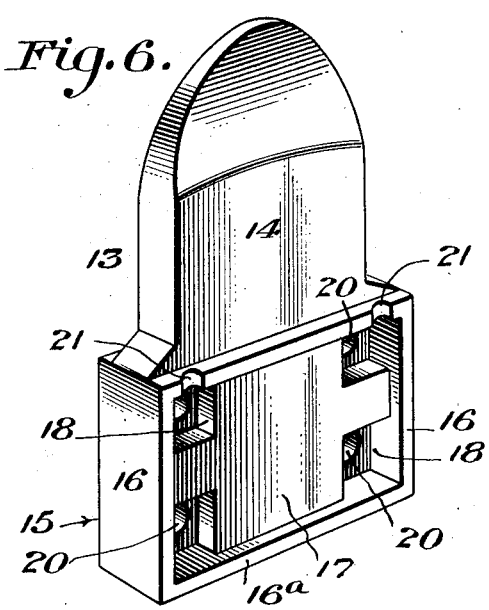
Fig. 6 is a perspective view of one of the tooth elements.

The sprocket wheel blank is formed as just described to facilitate the attachment and replacement of the teeth, which are formed as shown in Fig. 6. Each tooth element 13 comprises a tooth portion 14 and a tooth attaching shank 15 preferably made integral with each other as shown. The tooth portion 14 may take any desired form of sprocket tooth to be determined by the type of chain and character of the work to be performed. The shank 15 of each tooth comprises a body portion provided with a peripheral flange 16. The flange 16 is appreciably deeper than the central portion of the shank body 17. This serves to space the central depressed portions 17 of the attaching shank from the face of the plate 8 as shown in Figs. 2 and 3 when the teeth are mounted on the wheel in the manner to be later described. Furthermore the central portion 17 of the tooth shank is provided in each face thereof with a plurality of cavities or depressions 18. These depressions are preferably, though not necessarily, symmetrically located with respect to the shank of the tooth and the intermediate walls 19 between corresponding depressions 18 on opposite faces of the body portion 17, are pierced by apertures 20 designed to cooperate with apertures 11 of the plate 8 for the reception of bolts 12 as shown in Fig. 3.

Having thus described the sprocket wheel blank and the teeth which are designed to be mounted thereon, I will now describe the method I have devised for attaching the teeth to the wheel.

The openings 6—7 in the rim of the sprocket wheel blank are made appreciably larger than the tooth portions 14 of the tooth elements in order to permit the tooth elements to be readily placed in the tooth pockets formed by the plates 8 and the surrounding flanges 9 and 10. In placing a tooth element within its tooth pocket, the tooth portion is first entered in the tooth receiving opening 6 in the rim of the sprocket wheel blank and the tooth then projected through the rim of the wheel, the flange 16 of the attaching shank in this operation, riding over the flange 10 of the tooth pocket, the shank 15 eventually dropping within the pocket, on to the plate 8. In order to facilitate this operation it will be noted that the flange 10 is made relatively low so as to prevent interference between it and the flange 16 during this assembly step.

The teeth having been thus placed within their respective pockets, the said teeth must be accurately positioned with respect to the rim in accordance with the pitch of the chain with which the gear is to be used. To enable this operation to be accomplished without difficulty the holes 20 in the tooth shanks 15 are preferably made slightly larger in diameter than the bolts 12 as shown in the Fig. 3. As hereinbefore stated the tooth elements are preferably cast from some relatively hard and difficult machinable metal such as manganese steel and by coring the holes 20 during the casting operation, the costly step of drilling these holes is avoided. The bolts 12 are now entered through the holes 20 and 11, the latter being preferably of a diameter to form a snug fit with the bolts. The material of the wheel blank being relatively easily machined, the step of drilling the holes 11 may be done without difficulty or unusual expense.

The teeth are now shifted slightly in any desired direction to bring them accurately into their proper positions it being noted that the relative dimensions of the tooth pockets and tooth elements are such as to permit any necessary shifting of the teeth in order to bring them into their proper pitch positions. When the teeth on the wheel have been thus accurately positioned the bolts 12 are tightened and the teeth thus held against movement during the final steps of the process which will now be described.

In view of the fact that the tooth elements 13 and the tooth receiving pockets of the sprocket are designed to permit appreciable relative shifting of the teeth, it is desirable to provide means to completely fill and seal the unoccupied spaces between the tooth elements and tooth pockets after the teeth have been properly positioned. This may be conveniently done by flowing into said space some relatively hard, fusible metal such as zinc, Babbitt metal or the like as shown at A. In order to permit the metal to flow between the recessed body of the tooth shank and supporting plate 8, the flanges 16 of said shanks are preferably notched or transversely cut at one or more places as shown at 21. By thus notching the flange 16, the flowing metal A readily passes beneath the flange and up into the cavities or depressions 18 as shown in Figs. 2 and 3. The fluid metal is thus free to completely fill the unoccupied spaces between the flange 16 and the flanges 9 and 10 as well as the cavities 18, and the annular space existing between the tooth body 13 and the adjacent walls of the tooth openings 6—7. When solidified the metal thus flowed into the tooth pockets forms a hard metal packing which completely fills the spaces unoccupied by the tooth elements and bolts and provides a very substantial connection between the sprocket wheel blank and the tooth elements.

Figure 7:
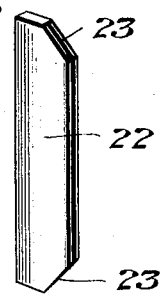
Fig. 7 is a perspective view of one of the lateral keys.

Another feature of importance in the present invention is the provision of lateral keys or wedge elements such as 22 shown in Fig. 7. These keys are preferably driven between the side flanges 16 and 9 of the tooth shanks 15 and plates 8 respectively after the tooth elements have been accurately positioned and bolted in place. These keys function to absolutely prevent any lateral shifting or skewing of the teeth under load strains and materially increase the strength and rigidity of the construction. The keys 22 as shown in Fig. 7 are bevelled as at 23 and are of a depth equal to the depth of the flanges 9. By thus dimensioning the keys, the metal flowed into the tooth pockets immerses the bevelled ends of the keys and thus, when solidified, positively prevents displacements of the keys.

It sometimes happens that due to irregularities in the tooth elements or tooth pockets incident to casting, a tooth element will not lie perfectly true with respect to the plane of the wheel and in such cases it is sometimes necessary to place shim elements between the edge 16a of the flange 16 and the plate 8. By this means the tooth elements may be easily and properly aligned with the plane of the wheel. This phase of alining the teeth with the wheel plane may be expedited by trueing off the edge 16a of the flange 16 by grinding or the like, for while the material of this flange is quite hard it yields readily to a grinding operation where a machining or milling operation would be exceedingly difficult and expensive.

From the foregoing description it is apparent that I have provided a practical and efficient method of securing tooth elements to sprocket wheel blanks without the necessity of machining the several parts. Nevertheless the construction of the joint between said parts is such as to provide a wheel which is substantially the equal in strength and rigidity to a wheel having integral teeth. Furthermore by forming the teeth as indicated and dimensioning them and their attaching shank symmetrically with respect to the tooth receiving pockets of the wheel blank, the detachable teeth are made also reversible. This feature alone doubles the normal life of the teeth and resulting wheel. In this connection attention is also directed to the fact that the cavities 18 provided in the opposite faces of the central portion 17 of the shanks perform the dual function of providing means for countersinking the heads of the attaching bolts 12 and also means for forming interlocking elements between the shanks and the metallic packing which is flowed into the spaces between the teeth and sprocket wheel blank.

The method of pouring or flowing the molten metal into the tooth pockets or the method of melting the same and draining it out when it is desired to remove or reverse the tooth form no part of the present invention since such methods are old and well known in other arts.

In conclusion it is to be noted that the foregoing description and accompanying ilustrations are but for the purpose of examples only and not to define the limits of my invention which are to be determined from the scope of the appended claims.

Having thus described my invention what I claim as new is:

1. A sprocket wheel including a rim provided with tooth openings, tooth pockets carried by the wheel inwardly of the rim, teeth positioned within the pockets and projecting through the openings in the rim, the tooth openings and pockets being dimensioned to provide spaces between the adjacent faces of the tooth, rim, and pockets, and packing material filling said spaces.

2. A sprocket wheel including a rim having a tooth opening therein, a tooth positioned in said opening, the opening being appreciably larger than the overall dimensions of the tooth to permit shifting of the tooth during assembly, and means for securing the tooth in an adjusted position on the wheel including packing material filling the space between the rim and tooth.

3. A sprocket wheel including a rim having a tooth opening therein, a tooth element fitted in said opening, said tooth element including a tooth projecting from the rim and a shank extending inwardly of the rim, and laterally of the tooth and beyond the walls of the tooth opening, a supporting plate carried by the wheel and positioned adjacent to said shank, and means disposed on opposite sides of the radial center line of the tooth element securing the tooth to said plate.

4. A tooth element for sprocket wheels comprising a tooth and an attaching shank integral therewith, the attaching shank being provided with a peripheral flange surrounding a central depressed portion, said depressed portion having a plurality of separated cavities therein.

5. A tooth element for sprocket wheels comprising a tooth and an attaching shank therefor, said attaching shank comprising a depressed central body portion and an upstanding rim section, said depressed body portion having formed in opposite faces thereof aligned cavities, the wall intervening between the cavities in the opposite faces of said depressed portion being apertured to permit the passage of securing elements therethrough.

6. A sprocket wheel comprising a wheel blank provided with tooth receiving pockets having side walls, tooth elements positioned within said pockets and means for securing the tooth elements therein, including longitudinally extending key elements disposed between the tooth elements and side walls of the pockets whereby to prevent circumferential shifting or skewing of the tooth elements with respect to the wheel blank.

7. A sprocket wheel comprising a wheel blank having tooth pockets therein, tooth elements positioned within said pockets, and means for securing the tooth elements therein, said means including lateral keys or wedges positioned between the tooth elements and the side walls of the tooth pockets, and means for preventing displacement of said keys comprising a packing material flowed into the unoccupied spaces between the tooth element and walls of the tooth pockets, said material immersing at least a part of each of said wedge elements.

8. In a sectional sprocket wheel, a sprocket wheel blank including a rim section provided with a plurality of tooth openings, and a supporting plate associated with each opening, said supporting plate being formed integrally with the rim section, and an upstanding peripheral flange on said plate.

9. A sprocket wheel including a rim having tooth openings therein, cast metal teeth for said rim, said teeth being dimensioned with respect to the tooth openings to permit relative shifting of the teeth during assembly to conform to a desired sprocket pitch irrespective of surface irregularities of the teeth due to casting, and means for securing the teeth in proper pitch relation including a metal packing material filling the spaces between the walls of the rim openings and teeth.

10. A sprocket wheel including a rim provided with tooth openings, tooth pockets carried by the wheel inwardly of the rim, cast teeth for the rim, said teeth being positioned within the pockets and projecting through the openings in the rim, the tooth openings and pockets being dimensioned with respect to said teeth to provide spaces between the adjacent faces of the teeth, rim and pockets to permit relative shifting of the teeth during assembly to conform to a desired sprocket pitch irrespective of surface irregularities of the teeth due to casting, and means for securing the teeth in proper pitch relation.

11. A sprocket wheel comprising a wheel blank provided with tooth receiving pockets having side walls, tooth elements positioned within said pockets and being dimensioned relative to said pockets to permit shifting of said tooth elements within the pockets to properly position the teeth with respect to a predetermined pitch, and means for securing the tooth elements therein, including longitudinally extending key elements disposed between the tooth elements and side walls of the pockets whereby to prevent circumferential shifting or skewing of the tooth elements with respect to the wheel blank after the teeth have been properly positioned within the pockets.

LEWIS E. SMOOT.